United States Patent
Crawford (10) Patent No.: US 7,152,554 B2
(45) Date of Patent: Dec. 26, 2006

(54) PET TRANSPORTER

(76) Inventor: Thomas Crawford, 619 N. Blakeley St., Montesano, WA (US) 98563

(*) Notice: Subject to any disclaimer, the term of this patent is extended or adjusted under 35 U.S.C. 154(b) by 0 days.

(21) Appl. No.: 10/987,043

(22) Filed: Nov. 12, 2004

(65) Prior Publication Data

US 2006/0105834 A1 May 18, 2006

(51) Int. Cl.
A01K 1/00 (2006.01)
A01K 31/07 (2006.01)

(52) U.S. Cl. ........ 119/496; 119/453

(58) Field of Classification Search .......... 119/496, 119/497, 453, 452; 280/31, 647, 649, 650, 280/24.31, 656, 204, 210
See application file for complete search history.

(56) References Cited

U.S. PATENT DOCUMENTS

| | | | | |
|---|---|---|---|---|
| 653,415 | A * | 7/1900 | Ford | 280/204 |
| 3,865,425 | A | 2/1975 | French | |
| 4,077,646 | A * | 3/1978 | Watkins | 280/204 |
| D276,713 | S | 12/1984 | Schacter | |
| 4,721,320 | A | 1/1988 | Creps et al. | |
| 5,113,793 | A | 5/1992 | Leader et al. | |
| 5,344,171 | A | 9/1994 | Garforth-Bles | |
| 5,516,131 | A * | 5/1996 | Novotny | 280/204 |
| 5,577,646 | A | 11/1996 | White | |
| 5,641,173 | A | 6/1997 | Cobb, Jr. | |
| 5,701,843 | A | 12/1997 | Lazides | |
| 5,718,191 | A | 2/1998 | O'Donnell | |
| 5,832,874 | A | 11/1998 | Ravin | |
| 6,099,008 | A | 8/2000 | Caffey | |
| 6,230,656 | B1 * | 5/2001 | Walach | 119/496 |
| 6,296,297 | B1 | 10/2001 | Barrow et al. | |
| 6,374,775 | B1 * | 4/2002 | Baumsteiger | 119/496 |
| 6,425,349 | B1 | 7/2002 | Laskin et al. | |
| 6,427,631 | B1 * | 8/2002 | Ross | 119/496 |
| 6,647,925 | B1 * | 11/2003 | Waiters | 119/494 |
| 6,708,995 | B1 | 3/2004 | Norris | |
| 6,766,769 | B1 * | 7/2004 | Doyle et al. | 119/496 |
| 6,896,272 | B1 * | 5/2005 | Burton | 119/496 |
| 2003/0067153 | A1 * | 4/2003 | Stickel | 280/801.1 |
| 2004/0065270 | A1 * | 4/2004 | King | 119/496 |

* cited by examiner

*Primary Examiner*—Teri Pham Luu
*Assistant Examiner*—Elizabeth Shaw
(74) *Attorney, Agent, or Firm*—Patterson, Thuente, Skaar & Christensen, P.A.

(57) ABSTRACT

A pet transporter that can be towed behind a wheeled vehicle is disclosed. The pet transporter comprises a carrier member, a frame adapted to receive the carrier member, a pair of side bows attached to the side walls of the carrier and to the frame, a pair of wheel assemblies attached to the frame on opposite sides of the carrier, and an attachment arm with a first end and a second end, wherein the first end is adapted to be attached to the frame proximate the front wall of the carrier and the second end is adapted to releasably attach to a rear axle of a wheeled vehicle. The pet transporter has a low center of gravity, making tipping of the pet transporter more difficult. In addition, few tools are required to assemble and disassemble the pet transporter.

18 Claims, 10 Drawing Sheets

PET TRANSPORTER

FIELD OF INVENTION

The invention relates generally to pet transportation devices. In particular, the invention relates to a pet transporter designed for a larger pet, such as a dog, that can be attached to a bicycle and towed behind the bicycle.

BACKGROUND OF THE INVENTION

Pet owners often desire to take their pets along with them when they are running errands, traveling, exercising, and so on, for many reasons including companionship, exercise and providing the pet with a change of environment. A pet can accompany the pet owner reasonably easily when in a car, but it is more difficult if the pet owner is using a motorcycle, scooter, ATV, bicycle or other such vehicle. Oftentimes, in particular, dog owners like to take their dog with them when they are bicycling. The dog may be able to keep up with the cyclist for a while, but eventually the dog may need a rest well before the cyclist is ready to stop. As a result, the cyclist may decide not to take the dog along on the ride, may overwork the dog, or make too many stops to be enjoyable for the cyclist. To this end, the owner may resort to using a pet transporter.

Pet or dog transporter devices are known in the art. Such a device may make the cyclist's outing more enjoyable for both cyclist and pet. U.S. Pat. No. 5,577,646 to White entitled "Pet Carrier for Bicycle," discloses a pet carrier that is affixed to a rack mounted above the rear wheel of the bicycle. The carrier has a cover such that the pet can be completely enclosed, or the cover may be opened such that the pet can extend its head from the carrier. However, due to the location of the carrier, the carrier can accommodate only a smaller pet.

U.S. Pat. No. 5,701,843 to Lazides entitled "Pet Mobile," appears to disclose a pet carrier with a foldable handle and retractable wheels, the wheels in a down position when the carrier is to be moved by being wheeled about. U.S. Pat. No. 5,113,793 to Leader et al. entitled "Mobile Pet Carrier," appears to disclose a cage-like enclosure that is mounted on a carriage with wheels and a handle, for pushing the carriage/enclosure combination. U.S. Pat. No. 3,865,425 to French entitled, "Pet Trailer," appears to disclose a trailer adapted to be towed behind a car, and adapted for carrying pets such as dogs.

U.S. Pat. No. 5,832,874 to Ravin, entitled "Pet Carrier," appears to disclose a pet carrier adapted for use with a bicycle or motorcycle. The carrier does not have a cover, but is open, and can be mounted on a rack above the rear wheel of the vehicle or can be towed behind the vehicle. The carrier includes a structure in the interior of the carrier, where the pet can be secured. U.S. Pat. No. 6,766,769 to Doyle et al. entitled "Pet Transporter for a Bicycle," appears to disclose a pet transporter that includes an enclosed housing for the pet. Four wheels are releasably attached to the bottom of the housing, and an elongated member connects the housing to a bicycle chair mount. It appears that a number of tools are required to assemble and disassemble the pet transporter.

A pet carrier mounted on a rack above the rear wheel of a bicycle limits the size of the pet that may accompany a cyclist to only a relatively small pet. This type of pet carrier is not designed for the owner of a larger pet. Other of the pet carriers are not designed to be towed behind a bicycle, but are used similar to a stroller and, therefore are not useful to a cyclist desiring to take a pet along on a bicycle ride. Yet other pet transporters that are designed to be towed by a bicycle may provide an open compartment for the pet, allowing road debris and mud to be kicked-up onto the pet by the rear tire of the bicycle. The open compartment may also tempt the pet to attempt to jump out of the compartment, thus potentially upsetting the carrier and the bicycle. Some pet transporters have a high center of gravity, which makes the transporter more prone to tipping, which may result in the bicycle also tipping over. In addition, some pet transporters attach to the bicycle at the seat post, which may cause the attachment arm to rub against the wheel when traversing uneven terrain, and cause the pet transporter and/or bicycle to tip. Further, some pet transporters are not easily assembled and disassembled for storage. Therefore, the transporter may take up storage space or may be time-consuming to assemble such that it is not used often.

Therefore, there is a need for a pet transporter apparatus that addresses the various needs of the prior art.

SUMMARY OF THE INVENTION

Although there exist a number of different types of pet carriers that a cyclist can utilize to bring a pet along on a cycling trip, there is a need for a lightweight multi-purpose pet transporter that can be easily assembled and disassembled with a minimum need for tools. In addition, when attached to the cycle in a towing position, the transporter should be stable, maneuverable, and provide an enclosed, safe and clean environment for the pet. When not in use as a transporter, the carrier member of the transporter should be available to be used as stationary carrier. The present invention is a pet transporter that is adapted to be towed behind a bicycle and hold a larger pet such as a dog. The carrier member of the pet transporter can be removed from the transporter frame and utilized as a standard sedentary dog crate or travel pet carrier. One embodiment of the pet transporter of the invention is described below in terms of use with a bicycle, however, with modification, the pet transporter can be used with other wheeled vehicles.

The pet transporter of the invention comprises a dog carrier seated in a lightweight frame. Two tubular side bows, one on each side of the carrier, are attached to the side rails of the frame and snap into notches formed in the carrier. A cross bar traverses the width of the carrier through the interior of the carrier, extends beyond the side of the carrier, and is attached at either end to the two side bows, with one mechanical fastener per side. The connection between the side bows, rails, and cross bar keeps the carrier from shifting in the frame without being directly affixed to the frame. An attachment arm extends from the frame, forms approximately a 45-degree angle, and attaches to the rear wheel axle of the bicycle. Two wheel assemblies, one on each side of the transporter, fit into plates affixed to the frame.

The pet transporter of the invention attaches to a bicycle at the rear wheel axle of the bicycle, providing for a low, stable attachment point. The placement of the attachment point reduces the possibility of the attachment arm grazing the rear tire, which could occur if the transporter was attached at the seat mount and, when traversing an uneven surface, the transporter dipped below the end of the bicycle. The two wheel structure, placement of the two wheels, and the placement of the carrier in the frame all provide for a transporter with a low center of gravity and good stability and maneuverability. The enclosed carrier prevents dirt and mud kicked-up from the road from reaching the pet inside.

The pet transporter of the invention does not require many tools to assemble or disassemble, or to attach the pet transporter to the bicycle, and only a few mechanical fasteners keep the pet transporter together. When not in use, the carrier part of the pet transporter can be used as an ordinary dog carrier, or it can be stacked and stored. These and other features of the pet transporter will be described with more particularity hereinafter.

Hence, the pet transporter of the invention can be towed by a bicycle or other wheeled vehicle, protects the pet from road debris, is not prone to tipping, stores compactly, and can be easily assembled and disassembled, such that the bicyclist or other-type vehicle operator would be more apt to use the pet transporter.

The pet transporter of the invention, with the features described above and hereinafter, can be put to myriad uses including but not limited to taking a pet along on a cycling trip, transporting a pet to a park or while running errands, law enforcement use as part of the K-9 patrol, and use in search and rescue operations to transport a dog and equipment to a site. The following detailed description illustrates the use of the pet transporter of the invention in conjunction with a bicycle. However, the pet transporter of the invention can be modified to attach to various wheeled vehicles including, but not limited to scooters, motorcycles, ATVs, and the like.

DETAILED DESCRIPTION

Figure 1:
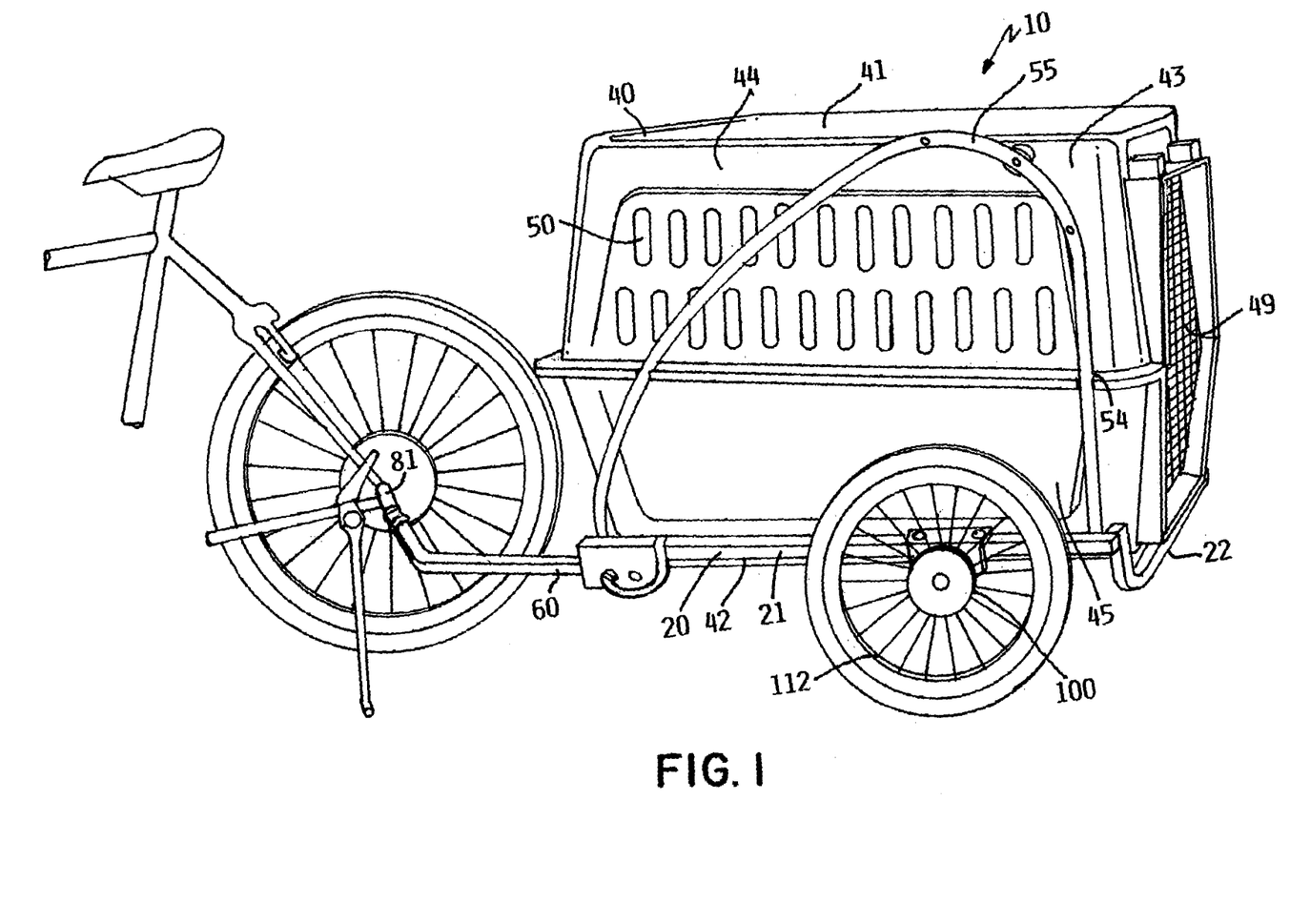
FIG. 1 is a side elevational view of the pet transporter attached to the back wheel of a bicycle.

Referring to FIG. 1, a pet transporter 10 is shown in assembled form, attached to a bicycle and ready for use. Pet transporter 10 generally comprises a frame 20, a carrier member 40, a pair of wheel assemblies 100 (only one shown), and a bicycle attachment arm 60. In this example embodiment, carrier 40 is seated snugly inside frame 20 such that no mechanical or other fasteners are required to maintain carrier 40 in contact with frame 20.

As best demonstrated in FIGS. 1–4, frame side rails 21 run along the length of carrier 40, on both sides of carrier 40, and back 22 and front 23 rails run along the width of carrier 40. Hence, frame 20 circumscribes carrier 40. Along the length of carrier 40, frame side rails 21 are substantially parallel to side of the carrier 40. In this example embodiment, front rail 23 and back rail 22 of frame 20 each form an elongated U-shape adapted to accommodate the bottom front of carrier 40, and the bottom rear and the lower rim of the access aperture into interior of the carrier 40.

Frame 20 is constructed of tubing, and in this example embodiment the tubing is square tubing, although other types of tubing shapes and materials are contemplated. The tubing provides for a lightweight frame 20 that is more easily pulled by a bicycle (or a scooter, for instance), yet strong enough to hold carrier 40 with the pet inside. Varying types of tubing may be used for frame 20, dependent upon weight the frame 20 must bear.

Referring further to FIGS. 1–4, carrier 40 generally comprises a top surface 41, a bottom surface 42 and four side surfaces 43 connecting the top surface 41 to the bottom surface 42. Generally, carrier 40 is made of a plastic material, but is not limited to same. Optionally, top surface 41 can comprise snapping points or other attachment mechanisms adapted to receive a basket or other container (not shown), wherein the container is adapted to hold equipment, gear, groceries, and myriad other types of items that are also desired to be transported.

Carrier 40 further comprises two pieces, an upper section 44 and a lower section 45, a break in the side surfaces horizontally bifurcating carrier 40 such that the two pieces are separable. When in use, upper section 44 and lower section 45 are held together by a plurality of mechanical fasteners. Further detail of upper section 44 and lower section 45 structures and the method of releasably coupling the two sections are provided below. Side surfaces 43 include a front wall 46, a back wall 47, and two side walls 48. Back wall 47 also comprises an aperture adapted to accommodate a door 49 for accessing the interior of carrier 40. A door 49 can take various forms including, but not limited to a solid door with air holes or a door comprising a wire grate structure. A simple locking device, such as a pin or hook and loop, allows door 49 to be fixed in place on carrier back wall 47. Optionally, a food container and/or a drink container can be affixed to the wire grate of door 49, providing food and drink to the pet, yet keeping the containers secured in place.

Carrier 40 further includes a plurality of openings 50, openings 50 providing light, air and a view into and out of carrier 40. When carrier 40 is not in use, upper section 44 and lower section 45 can be separated and stacked for more convenient storage. Door 49 to carrier 40 is removable and can be stacked inside one of the carrier sections.

Carrier upper section 44 and carrier lower section 45 are releasably secured to one another via mechanical fasteners 51. Mechanical fasteners 51 can include wing nuts and bolts, clamps, screws and the like. Upper section 44 of carrier includes a lip 52 extending horizontally from bottom of the upper section 44, and the lower section 45 of the carrier has a lip 53 extending horizontally from the top end of lower section 45. The lip of upper section 52 is affixed to the lip of lower section 53 with mechanical fasteners 51. To accommodate the use of wing nuts and bolts, or screws and the like, the lip of the upper section 52 of the carrier and the lip of the lower section 53 of the carrier both contain a plurality of apertures. The apertures may not be required if another securing system, such as a clamping system, is used.

The lip of upper section 52 and the lip of lower section 53 each contain a plurality of notches 54 cut into lips 52, 53. Notches 54 of upper carrier section 44 align with notches 54 in lower carrier section 45 when the two sections are mated. Notches 54 in lips 52, 53 are adapted to hold sections of the side bows 55.

Figure 2:
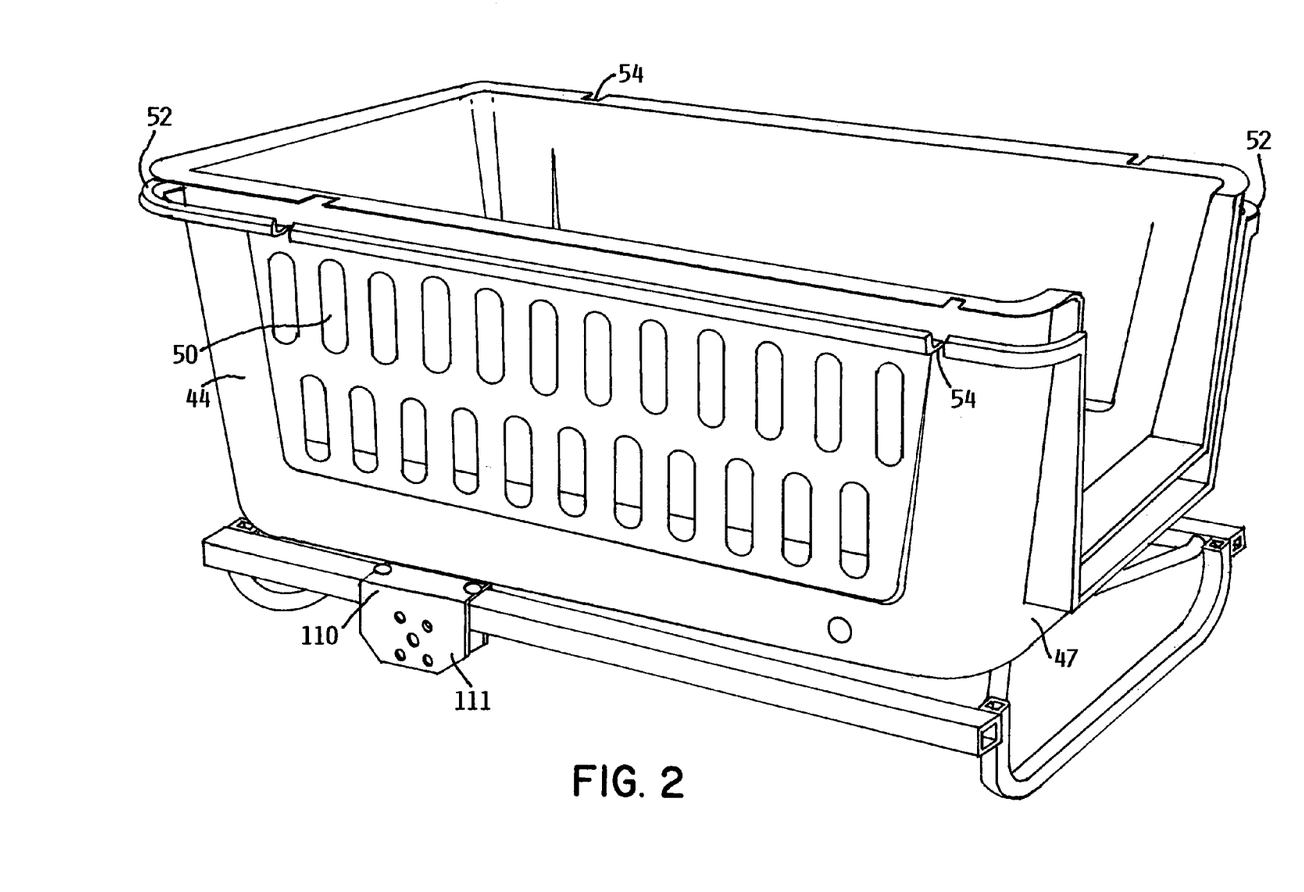
FIG. 2 is a side perspective view of the bifurcated carrier member on the frame, with one carrier section stacked inside the other.
Figure 4:
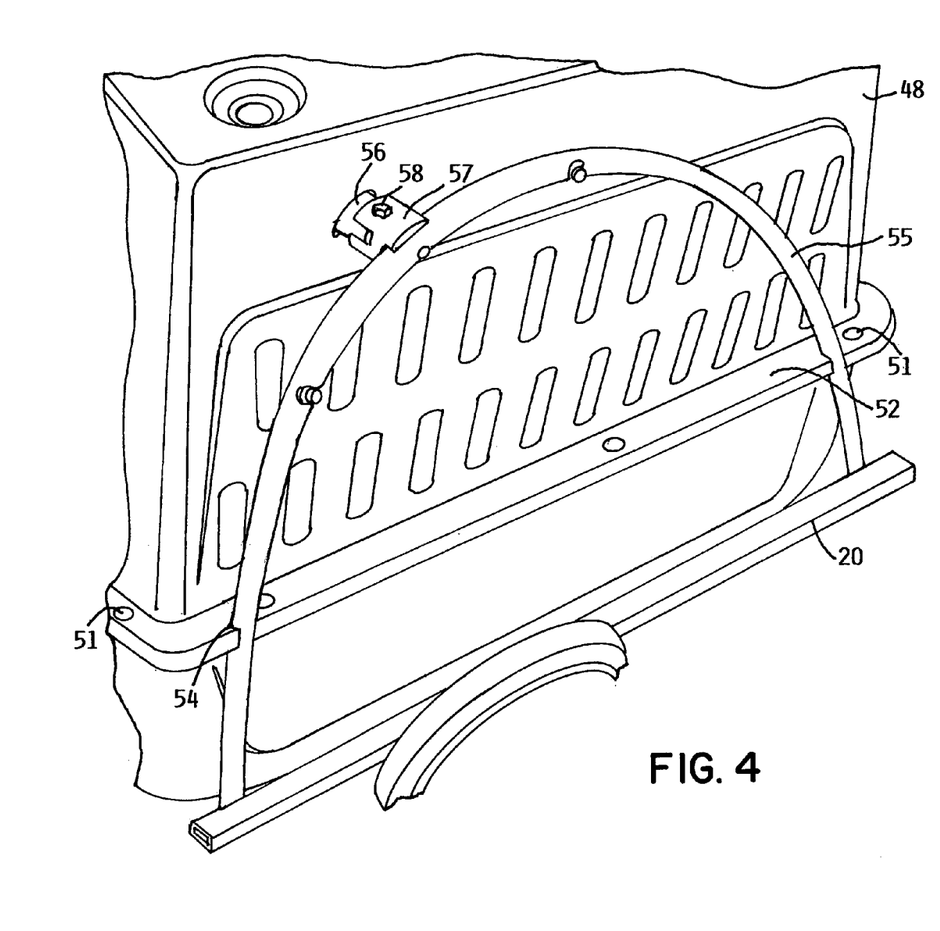
FIG. 4 is a perspective view of the carrier member with the side bows attached.

Referring generally to FIGS. 2 and 4, the upper section 44 of the carrier further contains an aperture located on the upper end of each side wall 48 of the carrier, traversing the width of carrier 40, the aperture adapted to receive a bar or tube. A cross bar 56 is passed through the two apertures, through the interior of carrier 40. Cross-bar 56 has a mount 57 attached to each end of cross bar 56. Mounts 57 can be made of rubber, metal, plastic or the like, but molded plastic is preferred. Cross-bar 56 ends extend beyond the two side walls 48 of the carrier, extending beyond the exterior side wall surface 48 of the carrier. One end of cross bar 56 is affixed to side bow 55 on one side of carrier 40 and the other end of cross bar 56 passes through the interior of carrier 40 and is affixed to side bow 55 on the opposite side of carrier 40. Cross-bar 56 is affixed to side bows 55 by way of mechanical fasteners 58 such as screws, bolts and the like. Mechanical fastener 58 passes through side bow 55 and into plastic mount 57 and thus secures cross bar 56 to side bow 55.

Referring back primarily to FIGS. 1 through 4, pet transporter 10 further comprises two sides bows 55, one on each side of carrier 40. Side bows 55 are made of round metal tubing, preferably aluminum tubing. The ends of the tubes comprise plastic end pieces 59, which allow for side bows 55 to be attached to frame 20 by mechanical fasteners such as screws, bolts, and the like. Side bow 55 extends vertically from rear side 48 of the carrier, and forms a concave arc as the tubing approaches the top of assembled carrier 40. The tubing that makes up side bow 55 extends from the rear of carrier 40 towards the front of carrier 40, along the side of carrier 40. Proximate the top of assembled carrier 40, the tubing curves downward and continues forward, still maintaining a concave arc. At the forward side 48 of the carrier, the tubing continues to curve downwards until the end of side bow 55 is attached to the forward part of frame 20.

As side bow 55 extends vertically towards the top of assembled carrier 40, side bow 55 is snapped into mated notches 54 of upper section 44 and lower section 45 of the carrier, proximate rear side 48 of the carrier. Side bow 55 is also placed or snapped into mated notches 54 located proximate front of 46 the carrier, as side bow 55 curves downward towards front 46 of the carrier. Proximate the apex of curved side bow 55, side bow 55 is affixed to cross bar 56 by a mechanical fastener. Two side bows 55 are affixed in this manner, one on each side of carrier 40. Cross-bar 56 releasably connects two side bows 55, and prevents carrier 40 from shifting in frame 20. No other fixation methods are required to maintain carrier 40 in frame 20. In addition, cross bar 56 acts as a roll bar, to provide protection to the top of carrier 40 and pet inside the carrier 40, should pet transporter 10 tip over.

Optionally, the side bows 55 may include a series of fasteners, such as snaps. The fasteners are adapted for use with various types of receptacles or bags, such as saddlebags. Theses bags can be attached to the side bows 55 and can contain clothes, supplies, groceries, and myriad other items the cyclist may want to take along on a trip or to transport.

Figure 3:
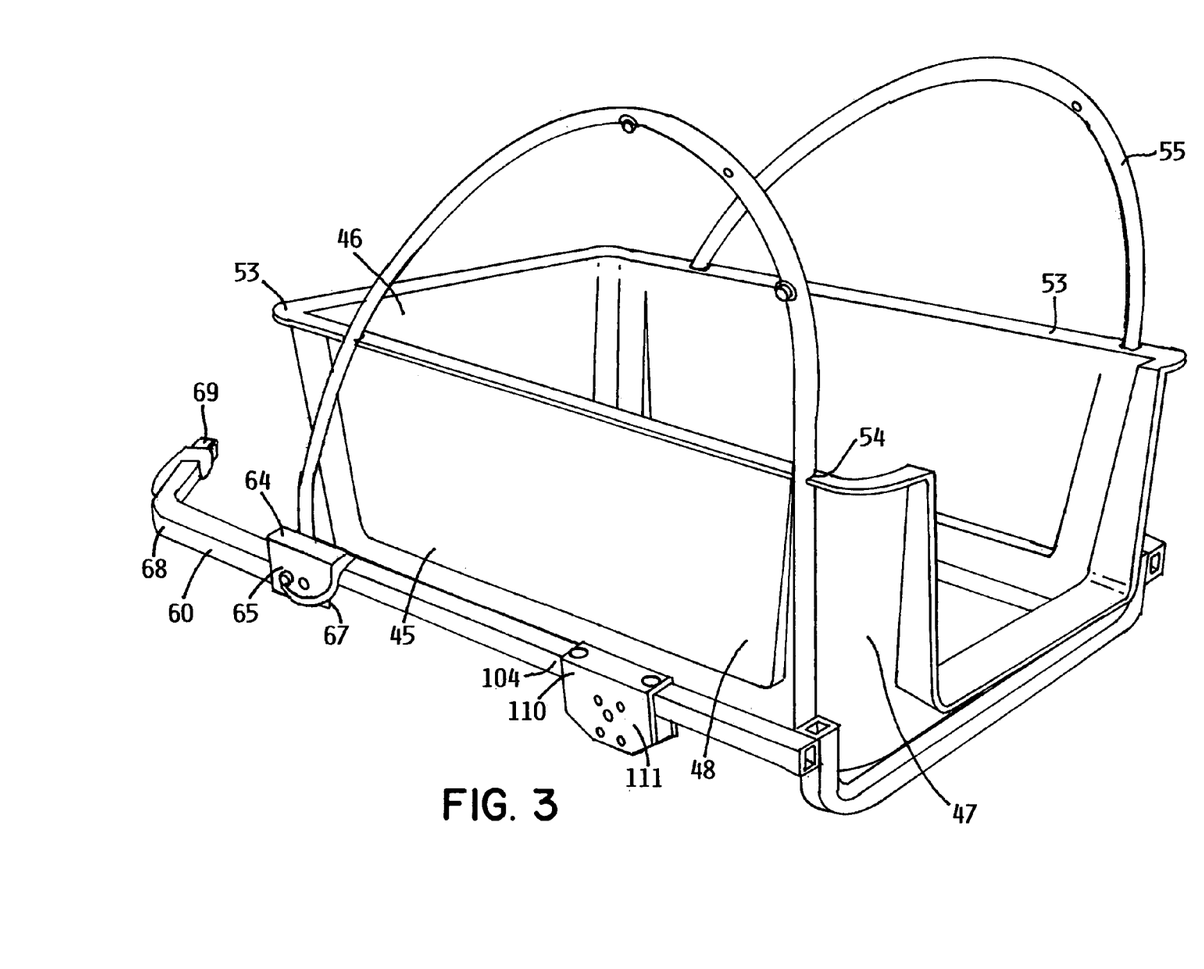
FIG. 3 is a side perspective view of the lower carrier section on the frame, with the side bows attached to the lower carrier section.
Figure 5:
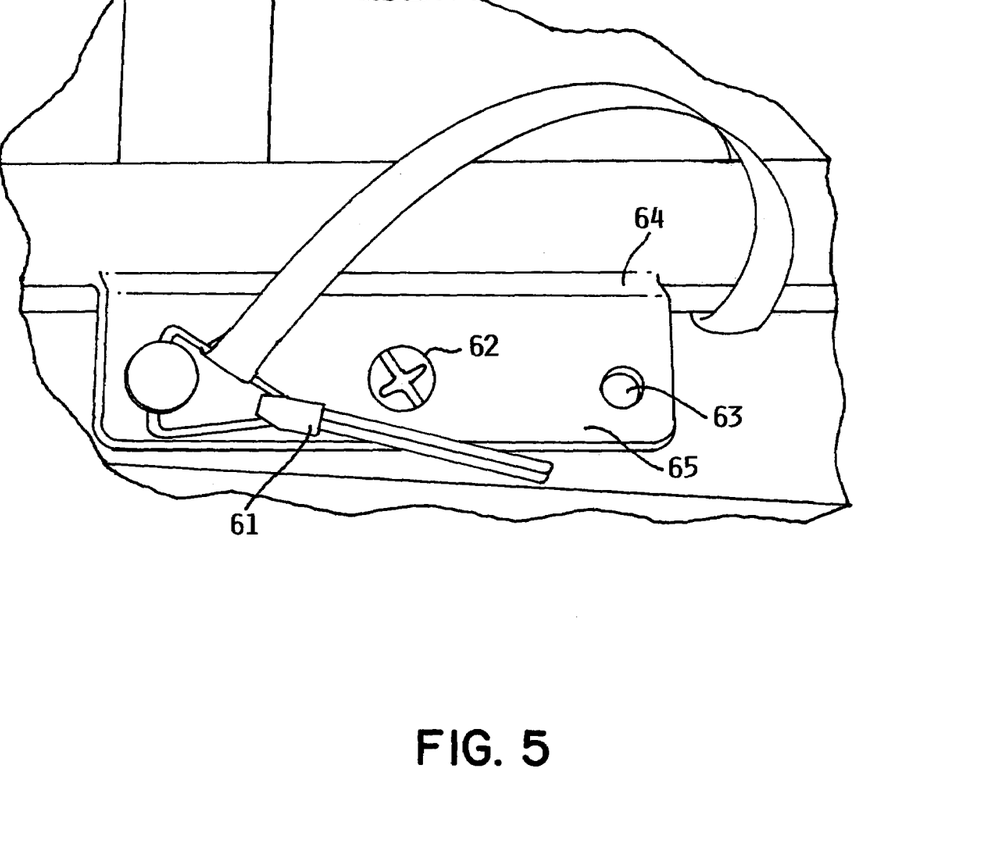
FIG. 5 is a view of the mounting brace of the attachment arm assembly.

Referring primarily to FIGS. 1, 3 and 5, extending from one side of the front of frame 20 is an attachment arm assembly 60 that connects frame 20 to the bicycle. Attachment arm assembly 60 comprises a mounting brace 65 and a tubular elongated member 68. Preferably, tubular elongated member 68, or attachment arm 68, is formed from square tubing, similar to the tubing comprising frame 20. The tubular elongated member 68 (or attachment arm 68) has a first end 67 and a second end 69. First end 67 of attachment arm 68 is pivotally attached to mounting brace 65, and second end 69 of attachment arm 68 is releasably attached to the bicycle. Proximate second end 69 of the attachment arm, near the midpoint of attachment arm 68, the attachment arm 68 forms an approximately 45 degree angle, and angles in front of carrier 40 to provide unobstructed attachment of pet transporter 10 to the bicycle without pet transporter 10 and bicycle grazing one another.

Mounting brace 65 is comprised of a folded plate 64 and is affixed proximate the front end of frame 20, on one side of frame 20. Mounting brace 65 can be affixed to frame 20 by mechanical fasteners or by welding mounting brace 65 in place. Further, mounting brace 65 comprises a plurality of apertures.

First end 67 of the attachment arm is pivotally attached to mounting brace 65 by a mechanical fastener 62 such as a nut and bolt and the like. Mechanical fastener 62 allows attachment arm 68 to pivot, such that attachment arm 68, in an extended position, can be releasably attached to the bicycle. When attachment arm 68 is extended, a clevis pin 61 is inserted into an aperture forward of the pivot point, such that attachment arm 68 is locked in a forward position. However, when pet transporter 10 is not in use, attachment arm 68 pivots such that it can be folded back along and underneath frame 20, along side carrier 40, and strapped to frame 20, compactly out of the way. Clevis pin 61 is moved to an aperture back of the pivot point, to secure the position of attachment arm 68 along frame 20.

Figure 6:
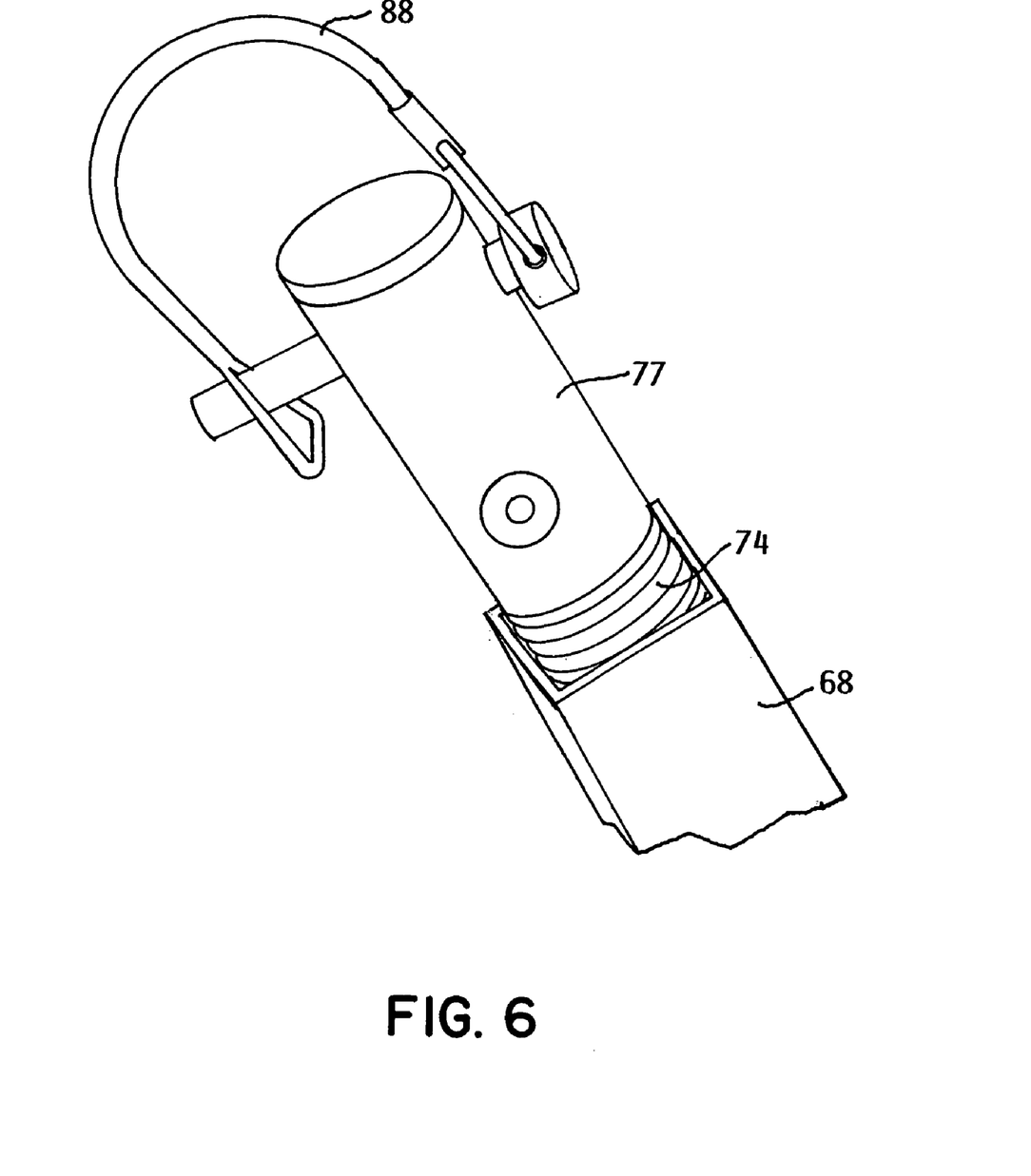
FIG. 6 is a view of the extension of the attachment arm that is adapted for connection to a coupler.
Figure 7:
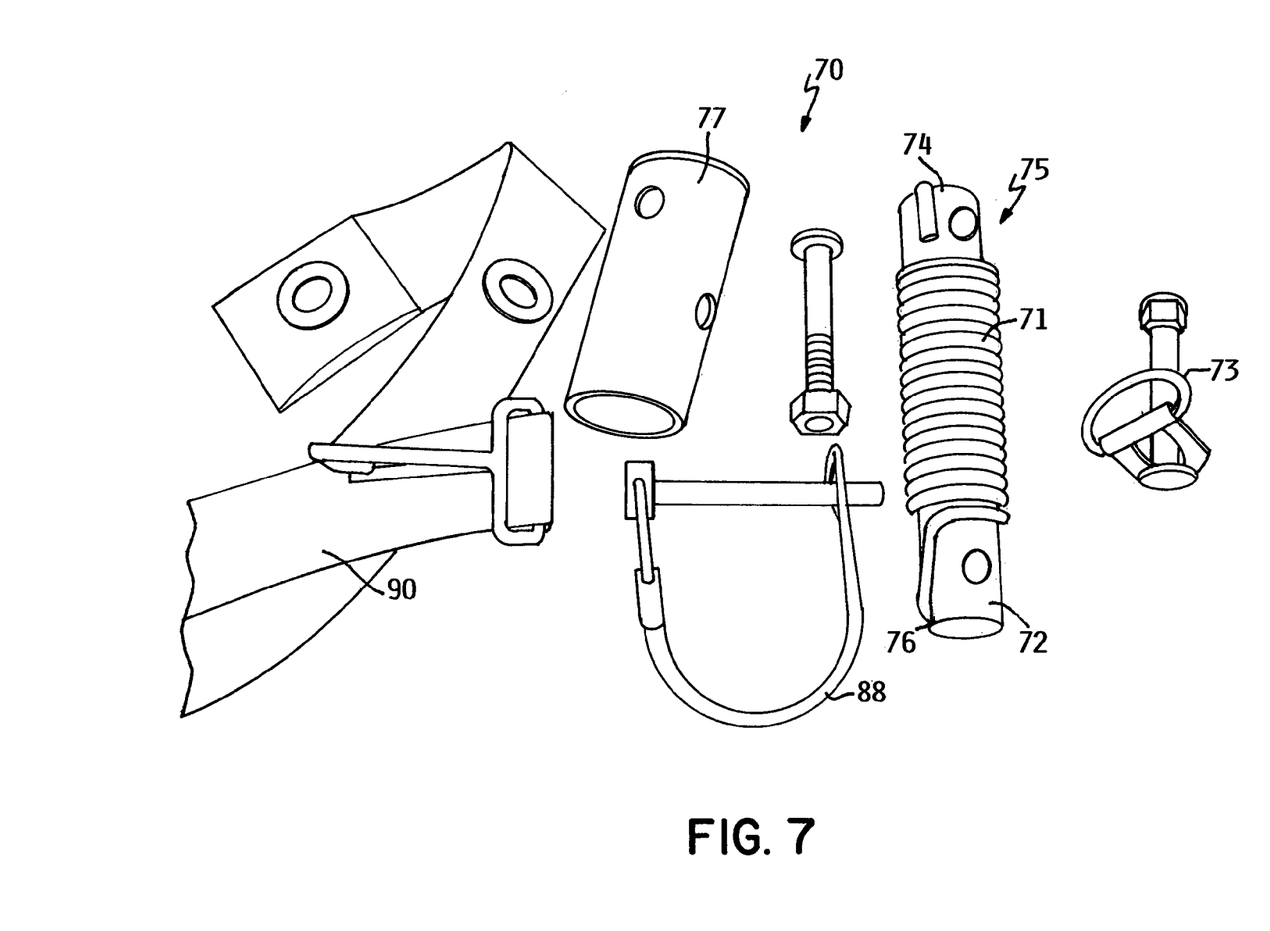
FIG. 7 is a view of the components of the attachment assembly.

Second end 69 of the attachment arm 68 is releasably attached to the bicycle by way of an attachment assembly 70 that attaches to the rear wheel axle 81. Referring primarily to FIGS. 6 and 7, the attachment assembly 70 comprises a spring-loaded insert 75 and a piece of round tubing 77. Round tubing 77 is adapted for releasable connection to a coupler 79 that is also releasably affixed to bicycle rear axle 81.

Spring-loaded insert 75 allows for easier attachment of attachment arm 68 to rear wheel axle 81 and better flexibility when connecting to the bicycle. Spring-loaded insert 75 comprises a spring 71, with a dowel 72 inserted in the curve at each end of spring 71. Each end of spring 71 contains a rubber or plastic dowel 72 with at least one aperture. A first end of spring 74 is inserted into the end of attachment arm 68 and a mechanical fastener is inserted through an aperture proximate the end of attachment arm 68, through the aperture in dowel 72 and through the opposite side of attachment arm 68. Thus, the first end of the spring 74 is secured to attachment arm 68. The mechanical fastener can be screw, a nut and bolt, a nut and bolt with an attached D-ring 73, the D-ring 73 used to secure a safety strap 90 as described below.

A second end of the spring 76 is inserted into a cylindrical tube 77, cylindrical tube 77 comprising a plurality of apertures. The second end of spring 76 is affixed to the cylindrical tube by a mechanical fastener. Cylindrical tube 77 is attached to the end of attachment arm 68 via spring-loaded insert 75, and becomes an extension of attachment arm 68. A safety strap 90 with a plurality of apertures can be affixed to cylindrical tube 77 by using the same fastener that affixes the second end of spring 76 to the cylindrical tube 77. The fastener passes through an aperture proximate a first end of the strap 90, through cylindrical tube 77 and the second end of spring 76. In another embodiment, safety strap 90 can be affixed to cylindrical tube 77 by a mechanical fastener and a separate aperture in the cylindrical tube. A second end of safety strap 90 can be wrapped around the rear frame of the bicycle and then clipped to the D-ring 73 located proximate the end of attachment arm 68 and the first end of spring 74.

Figure 8A:
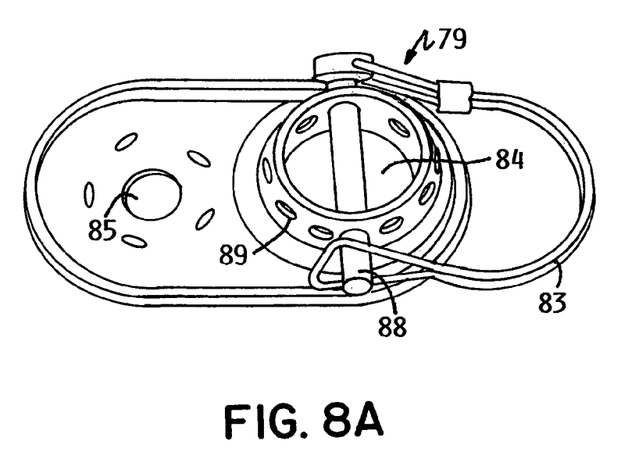
FIG. 8A is a view of the coupler.
Figure 8B:
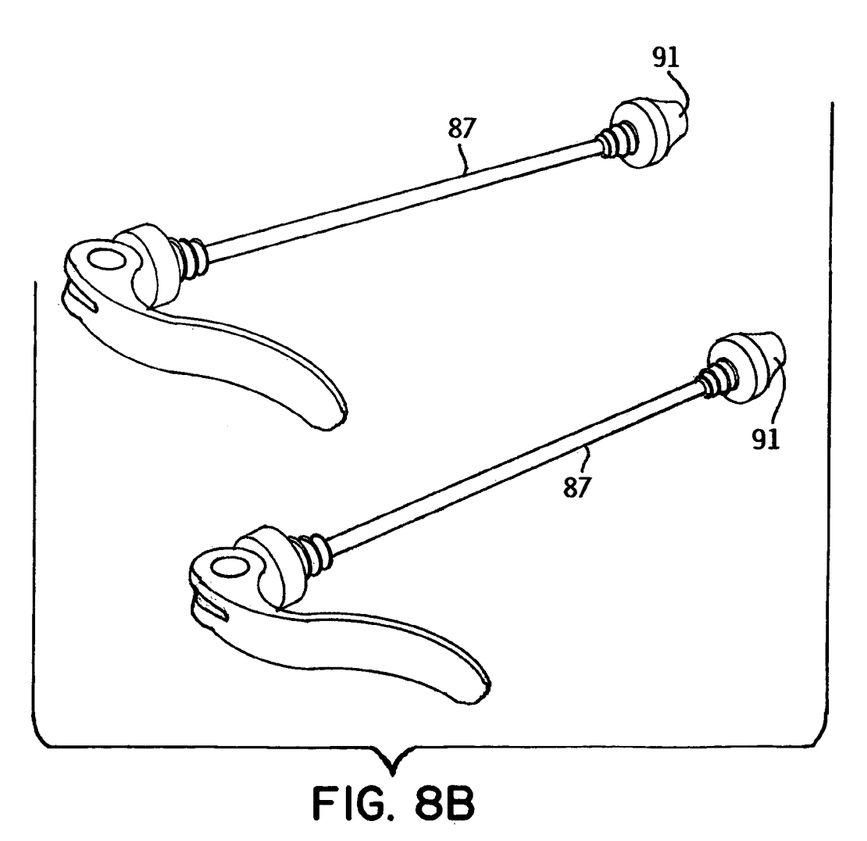
FIG. 8B is a view of the skewers.
Figure 9:
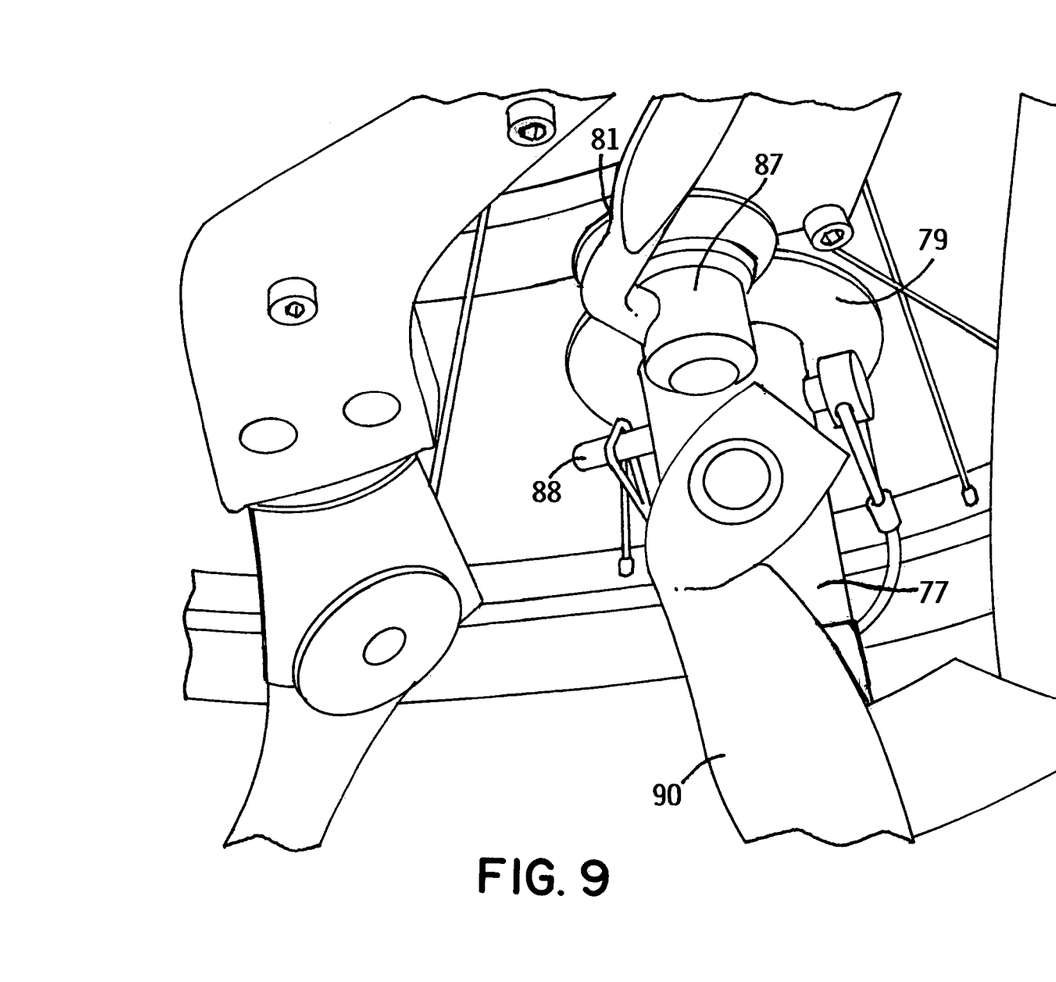
FIG. 9 is a view of the attachment assembly and a rear wheel axel of a vehicle.

As shown primarily in FIGS. 8A, 8B and 9, a coupler 79 is releasably attached to rear wheel axle 81, such that coupler 79 is adapted to accept attachment assembly 70. Cylindrical tube 77 of attachment assembly 70 is releasably attached to the bicycle by way of coupler 79 that is attached to rear wheel axle 81.

Coupler 79 comprises at least two apertures; a smaller aperture 85 adapted to accept the shaft or skewer 87 of a quick-release hub, and a larger aperture 84 adapted to accept cylindrical tube 77 of attachment assembly 70. Coupler 79 further comprises a clevis pin 88 with a flip safety wire. The handle of the quick-release hub 86 is pulled, thus releasing skewer 87. The end nut 91 of the skewer 82 is removed and the skewer 87 is removed from the wheel. The smaller aperture 85 of the coupler is aligned with the wheel aperture left vacant by skewer 87, and skewer 87 is replaced into the wheel by passing through the smaller aperture 85 in the coupler. The end nut 91 of the skewer 82 is replaced, screwed back into place, and the handle of the quick-release hub 86 is placed in the locked position, thus securing coupler 79 to the axle of the rear wheel 81 of the bicycle.

Cylindrical tube 77 of attachment assembly 70 is releasably attached to coupler 79 by inserting cylindrical tube 77 through the larger aperture 84 of the coupler. Cylindrical tube 77 comprises a plurality of apertures, and at least two of the apertures are located diametrically across from one another. These two apertures are aligned with the apertures in the upright periphery 89 surrounding the larger aperture 84 of the coupler. Clevis pin 88 is inserted through the aligned apertures of cylindrical tube 77 and coupler 79. The flip wire safety bail secures the linkage provided by clevis pin 88. Hence, coupler 79 is secured to the bicycle wheel by skewer 87, and attachment assembly 70 is secured to coupler 79, thus securing attachment arm 68 to the bicycle.

Figure 10:
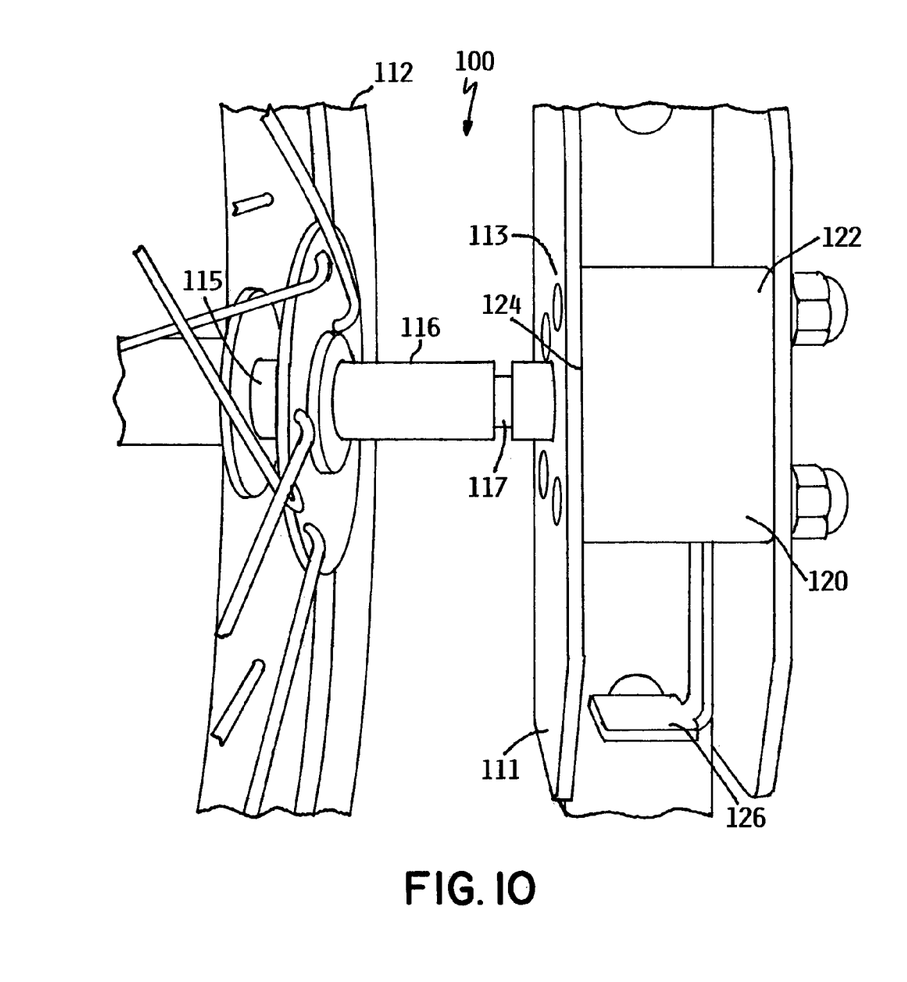
FIG. 10 is a view of the carrier wheel assembly.

Referring primarily to FIGS. 2 and 10, carrier wheel assembly 100 comprises a wheel 112, a spindle 116, an attachment plate 110 and a tire frame lock 120. Wheel 112 attaches to attachment plate 110 located at rear side rail 21 of the frame, each attachment plate 110 being located on each side of frame 20 to accommodate a wheel 112 on each side of frame 20. The following describes wheel assembly 100 on one side of frame 20, which is duplicated on the other side of frame 20. Referring to FIG. 3, two folded plates 104 are wrapped around frame side rail 21, forming one integral attachment plate 110. Plates 104 are secured to side rail 21 by way of a plurality of mechanical fasteners attaching the top surface of plates 104 to the top surface of side rail 21. Two faces 111 of attachment plate 110 extend substantially perpendicularly down from the top surface of attachment plate 110 and the top surface of side rail 21. The faces 111 of attachment plate 110 comprise a plurality of apertures.

A tire frame lock 120 comprising a case 122 and a spring-loaded lever 126 is inserted into the interior of attachment plate 110, between the attachment plate faces 111. Tire frame lock case 122 comprises a plurality of apertures that traverse case 122. A plurality of the apertures traversing tire frame lock case 122 are aligned with the apertures in the two faces of attachment plate 111, and tire frame lock 120 is secured to the two faces of attachment plate 111 by mechanical fasteners such as nuts and bolts, screws and the like.

A further part of wheel assembly 100 is wheel 112 and wheel axle 115, where wheel axle 115 comprises a spindle 116 that extends beyond the side of wheel 112. Spindle 116 further comprises a groove 117 formed around the circumference of spindle 116. Spindle 116 is releasably attached to the exterior attachment plate face 111, which is the attachment plate face 111 that faces out from pet transporter 10. Spindle 116 is inserted into an aperture in the attachment plate face 111 that is also aligned with the larger, substantially center aperture 124 in the case of tire frame lock 122. Spindle 116 is inserted until tire frame lock 120 clicks, a portion of the locking device clicking into groove 117 of wheel axle spindle 116, thus securing wheel 112 to frame 20. To release the spindle 116 from the tire frame lock 120, the spring-loaded lever 126 is pulled, thus releasing the wheel 112.

One method of assembling pet transporter 10 is to first position lower carrier section 45 in frame 20, then side bows 55 are attached to frame 20 and snapped into notches 54 in the lower section 45 of the carrier. Next, the upper section 44 of the carrier is mated to the lower section 45 of the carrier by mechanical fasteners, and side bows 55 are then snapped into notches 54 in the upper section 44 of the carrier. Cross-bar 56 is inserted through the two apertures in the upper section 44 of the carrier and the ends of cross bar 56 are affixed to side bows 55, by one fastener each. Next, wheels 112 are releasably snapped into the faces of the plates 111 on frame 20, and attachment arm 68 is unfolded and attached to coupler 79 that has already been releasably attached to rear wheel axle 81 of the bicycle. Other orders of assembly of pet transporter 10 are also contemplated.

If frame 20 and side bows 55 remain attached while in storage, then when pet transporter 10 is to be used again, wheels 112 are snapped into face plates 111 on frame 20, carrier 40 is placed in frame 20, side bows 55 are snapped into carrier notches 54, and cross bar 56 is attached to side bows 55. Pet transporter 10 is then ready to be attached to the bicycle, once coupler 79 is in place.

It is contemplated that features disclosed in this application can be utilized to suit particular circumstances and manufacturing needs. Various other modifications and changes will be apparent to those of ordinary skill. Although the pet transporter of the invention has been described in use with a bicycle, the various embodiments of the pet transporter of the invention described herein can be modified to attach to various vehicles including, but not limited to, scooters, motorcycles, ATVs and the like. In addition, although various embodiments of the present invention have been disclosed here for purposes of illustration, it should be understood that a variety of changes, modifications and substitutions may be incorporated without departing from either the spirit or scope of the present invention.

The invention claimed is:

1. A pet transporter comprising:
   a carrier member comprising a top surface, a bottom surface, two side walls, a front wall and a back wall, wherein the side walls, front wall and back wall connect the top and bottom surfaces and wherein the back wall comprises a door, wherein the carrier member is horizontally bifurcated, forming an upper section and a lower section, wherein the upper section comprises a horizontally protruding lip at a lower edge of the upper section, and the lower section comprises a horizontally protruding lip at an upper edge of the lower section, and wherein the horizontally protruding lips comprise a plurality of notches and a plurality of apertures;
   a frame adapted to receive and support the carrier member, the frame member adapted to be in contact with the bottom and side surfaces of the carrier member;
   a pair of side bows attached to the side walls of the carrier and to the frame, wherein a first end of the side bow is attached to the rear side of the frame, and a second end of the side bow is attached to the front side of the frame, each of the side bows forming a concave arc as the side bow traverses the side of the carrier and approaches the top of the carrier, and wherein segments of the side bow are placed into the notches in the carrier lips;

a pair of wheel assemblies attached to the frame on opposite sides of the carrier; and an attachment arm comprising a first end and a second end, wherein the first end is adapted to be attached to the frame proximate the front wall of the carrier, and wherein the second end is adapted to releasably attach to a rear axle of a wheeled vehicle.

2. The pet transporter of claim 1, wherein the carrier upper section and lower section are releasably mated by mechanical fasteners selected from the group consisting of nuts, bolts, screws, wing nuts, and clamps.

3. The pet transporter of claim 1, wherein each side wall of the carrier comprises an aperture proximate the top of the side wall, wherein the two apertures are diametrically opposed to one another.

4. The pet transporter of claim 1, further comprising a cross-bar that traverses a width of the interior of the carrier, wherein a first end of the cross bar extends through an aperture in a top side of the carrier and a second end of the cross-bar extends through a second aperture in a top side of the carrier, and wherein each end of the cross-bar is affixed to a side bow proximate the apex of the side bow arc.

5. The pet transporter of claim 1, wherein the frame comprises two side rails, a front rail, and a back rail.

6. The pet transporter of claim 5, further comprising two wheel assembly attachment plates each of which is affixed to the side rails proximate the back portion of the side rails.

7. The pet transporter of claim 6, wherein each wheel assembly attachment plate comprises two face plates and a tire frame lock inserted between the two face plates, the tire frame lock comprising a plurality of apertures, at least one aperture adapted to receive a spindle from a wheel axle.

8. The pet transporter of claim 5, further comprising a mounting brace affixed proximate the front end of one of the frame side rails, the mounting brace comprising a folded plate and a plurality of apertures.

9. The pet transporter of claim 8, wherein the first end of the attachment arm is pivotally attached to the mounting brace such that the attachment arm can be extended to attach to a wheeled vehicle.

10. The pet transporter of claim 8, wherein the first end of the attachment arm is pivotally attached to the mounting brace such that the attachment arm can be folded along and underneath the frame.

11. The pet transporter of claim 1, wherein each wheel assembly includes a wheel, wheel axle and a spindle that passes through the axle of the wheel, wherein the spindle comprises a groove circumscribing the circumference of the spindle, and wherein the spindle is inserted into a tire frame lock aperture until the tire frame lock engages the spindle groove, thus securing the wheel to the frame.

12. The pet transporter of claim 1, wherein the second end of the attachment arm comprises a spring-loaded insert and a round tube, wherein a first end of the spring loaded insert is affixed to the attachment arm and a second end of the spring-loaded insert is inserted into and attached to the round tube.

13. The pet transporter of claim 1, wherein the rear axle of a wheeled vehicle comprises a quick-release hub with a skewer.

14. The pet transporter of claim 1, further comprising a coupler, wherein the coupler comprises at least two apertures and a clevis pin, and wherein the coupler is releasably affixed to the rear axle of a wheeled vehicle by a quick-release hub skewer.

15. The pet transporter of claim 14, wherein a round tube affixed to the second end of the attachment arm is releasably attached to the coupler and secured by the clevis pin.

16. The pet transporter of claim 1, wherein the attachment arm proximate its second end forms an angle and angles in front of the carrier member.

17. The pet transporter of claim 1, wherein the upper section of the carrier member is removed and a strap is affixed to the back wall of the carrier member, such that the carrier member can be used to carry goods.

18. The pet transporter of claim 1, further comprising a plurality of fasteners affixed to the side bows, wherein the fasteners are adapted to receive at least one receptacle selected from the group consisting of pouches, packs, saddlebags, sacks, backpacks and bags.

* * * * *